(12) United States Patent  
Ryder et al.

(10) Patent No.: US 7,480,139 B2
(45) Date of Patent: Jan. 20, 2009

(54) ELECTRONIC DEVICE DOCKING SYSTEM

(75) Inventors: Brian D. Ryder, Tomball, TX (US);
Paul N. Walker, Cypress, TX (US);
Earl W. Moore, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 11/586,163

(22) Filed: Oct. 25, 2006

(65) Prior Publication Data

US 2008/0100995 A1 May 1, 2008

(51) Int. Cl.
*H05K 5/00* (2006.01)
(52) U.S. Cl. .................. 361/686; 320/113; 439/929
(58) Field of Classification Search .......... 439/929; 361/686; 320/113, 115; 710/303, 304
See application file for complete search history.

(56) References Cited

U.S. PATENT DOCUMENTS

| D361,987 | S | 9/1995 | Yamazaki | |
|---|---|---|---|---|
| 5,604,663 | A | * 2/1997 | Shin et al. | 361/686 |
| 5,627,450 | A | * 5/1997 | Ryan et al. | 361/686 |
| 6,040,681 | A | * 3/2000 | May | 320/113 |
| 6,046,571 | A | * 4/2000 | Bovio et al. | 320/113 |
| 6,061,233 | A | 5/2000 | Jung | |
| D456,802 | S | 5/2002 | Malson | |
| 6,563,702 | B1 | * 5/2003 | Shin et al. | 361/686 |
| 6,626,686 | B1 | 9/2003 | D'Souza et al. | |
| 7,333,325 | B2 | * 2/2008 | DeLuga et al. | 361/683 |
| 2005/0162824 | A1 | 7/2005 | Thompson | |

* cited by examiner

*Primary Examiner*—Neil Abrams

(57) ABSTRACT

An electronic device docking system comprises a docking station configured to receive docking of an electronic device with an external battery coupled thereto, the docking station comprising at least one mechanism actuatable to cause detachment of the electronic device from both the external battery and the docking station. The docking system may include a pair of release mechanisms, one of which enables release of the electronic device and the external battery as a unit and a second one that enables release of the electronic device from the docking system while the external battery remains with the docking system.

19 Claims, 3 Drawing Sheets

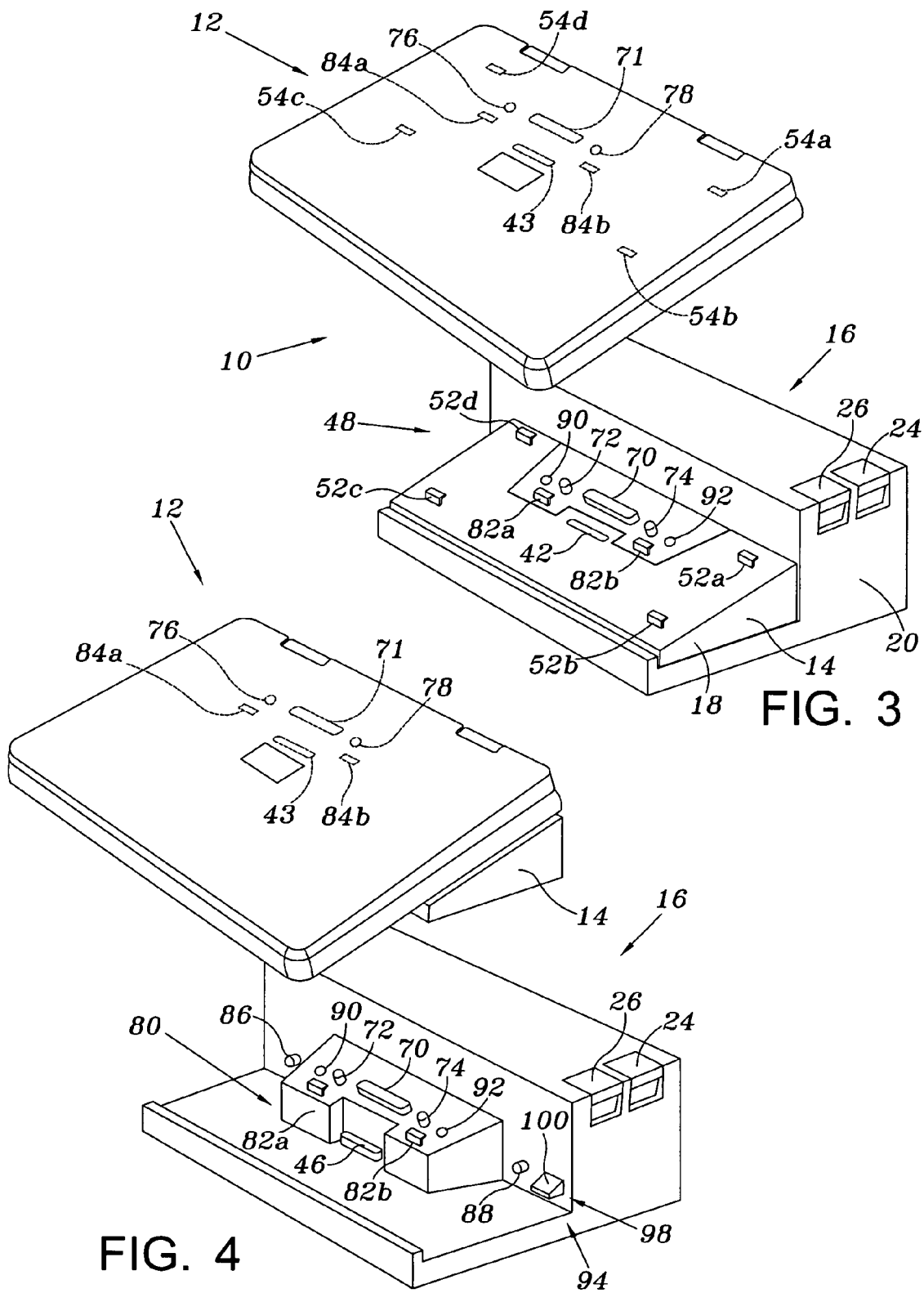

ELECTRONIC DEVICE DOCKING SYSTEM

BACKGROUND

Electronic device docking systems are used to enable quick and easy connection and disconnection of an electronic device, such as a laptop or notebook computer, to a power source and/or one or more peripheral devices (e.g., a display device, an image capture device, a printer, etc.). However, the use of externally mounted secondary power supplies (e.g., battery packs or travel batteries) to the electronic device makes using a docking system problematic. For example, assuming a particular docking system supports docking of the electronic device with the external mounted battery attached thereto, if a user desires to use the electronic device apart from the docking system and without the external battery, the electronic device must be undocked and then the external battery removed from the electronic device.

BRIEF DESCRIPTION OF THE DRAWINGS

For a more complete understanding of the present invention, and the objects and advantages thereof, reference is now made to the following descriptions taken in connection with the accompanying drawings in which:

FIG. 3 is a diagram illustrating a partially exploded assembly view of the electronic device docking system of FIG. 1; and FIG. 4 is a diagram illustrating another partially exploded assembly view of the electronic device docking system of FIG. 1.

DETAILED DESCRIPTION OF THE DRAWINGS

The preferred embodiments and the advantages thereof are best understood by referring to FIGS. 1-4 of the drawings, like numerals being used for like and corresponding parts of the various drawings.

Figure 1:
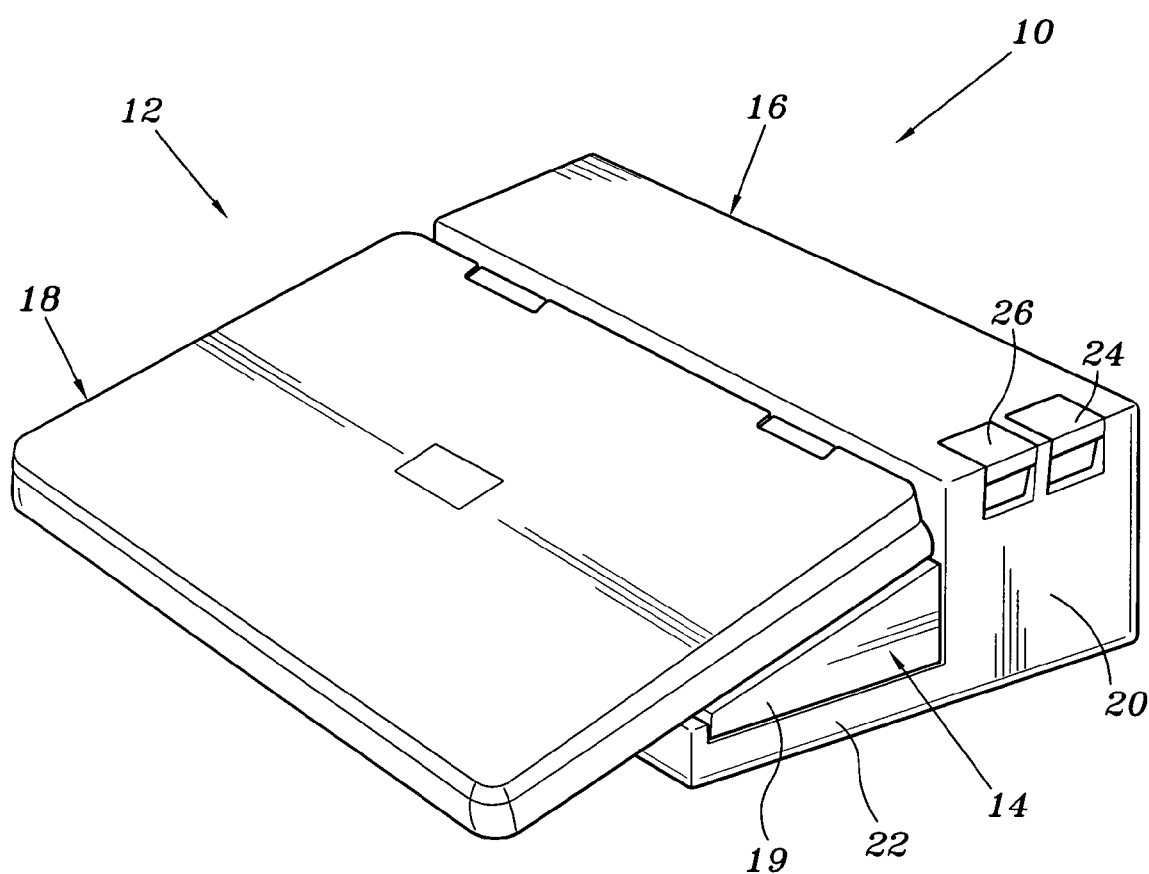
FIG. 1 is a diagram illustrating an embodiment of an electronic device docking system.

FIG. 1 is a diagram illustrating an embodiment of an electronic device docking system 10. In the embodiment illustrated in FIG. 1, docking system 10 comprises an electronic device 12, a external power supply 14 and a docking station 16. Embodiments of system 10 enable electronic device 12 and power supply 14 to be selectively and removeably coupleable to docking station 16. In the embodiment illustrated in FIG. 1, electronic device 12 comprises a notebook or laptop computer 18; however, it should be understood that electronic device 12 may comprise other types of computer devices such as, but not limited to, tablet personal computers, handheld computing devices, or any other portable computing device. Power supply 14 is removeably coupleable to electronic device 12 to provide power to electronic device 12. In the embodiment illustrated in FIG. 1, power supply 14 comprises an external or secondary detachable power supply such as an external battery or battery pack 19.

In the embodiment illustrated in FIG. 1, docking station 16 comprises a full release mechanism 24 and a partial release mechanism 26 to enable a user to select between a full detachment mode and a partial detachment mode. For example, if a user desires the full detachment mode, full release mechanism 24 is actuated to detach electronic device 12 and power supply 14 from docking station 16 without separating electronic device 12 from power supply 14. If the user desires a partial detachment mode, partial release mechanism 26 is actuated to detach electronic device 12 from docking station 16 and power supply 14 such that power supply 14 and docking station 16 remain in communicative engagement.

In the embodiment illustrated in FIG. 1, docking station 16 comprises an adapter portion 20 for enabling communicative engagement, wired or wirelessly, between electronic device 12 and a plurality of peripheral devices coupleable to adapter portion 20 such as, but not limited to, an external display screen, a printer, an image capture device or any other device configured for communicative engagement with electronic device 12. Docking station 16 further comprises a base member 22 extending from a lower portion of adapter portion 20 to support electronic device 12 and power supply 14 thereagainst, at least partially, while docked on docking station 16; however, it should be understood that docking station is configurable without base member 22 such that power supply 14 and/or electronic device 12 is supported by any surface that also supports docking station 16 (e.g., a table, desk, shelf, wall, etc.).

Figure 2:
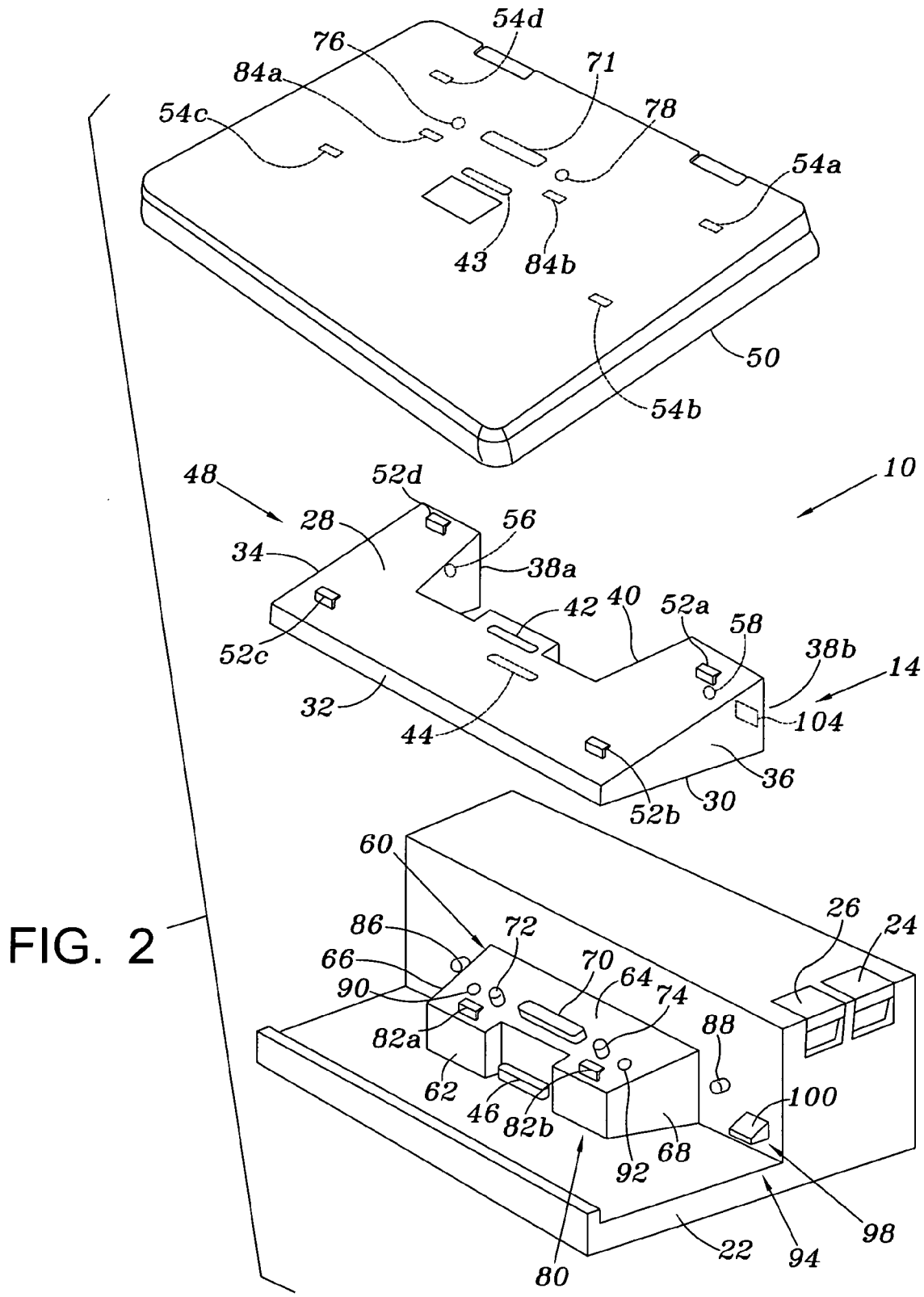
FIG. 2 is a diagram illustrating an exploded assembly view of the electronic device docking system of FIG. 1.

FIG. 2 is a diagram illustrating an exploded view of docking system 10 of FIG. 1. In the embodiment illustrated in FIG. 2, power supply 14 comprises a top surface 28, a bottom surface 30, a front surface 32, side surfaces 34 and 36, rear surfaces 38a and 38b, and a recessed area 40. In the embodiment illustrated in FIG. 2, power supply 14 also comprises a connector member 42 disposed on top surface 28 for communicative engagement with a corresponding connector member 43 on electronic device 12. Power supply 14 further comprises a connector member 44 disposed on bottom surface 30 for communicative engagement with a corresponding connector member 46 disposed on docking station 16. Additionally, a connector member 70 is disposed on docking station 16 for communicative engagement with a corresponding connector member 71 disposed on bottom surface 50 of electronic device 12. Thus, connector members 42 and 43 enable power and/or other signals to be communicated between power supply 14 and electronic device 12, connector members 44 and 46 enable power and/or other signals to be communicated between power supply 14 and docking station 16, and connector members 70 and 71 enable power and/or other signals to be communicated between electronic device 12 and docking station 16.

In the embodiment illustrated in FIG. 2, docking station 16 is configured to recharge an internal power supply of electronic device 12 and recharge power supply 14 when coupled thereto, either together or independently. For example, when electronic device 12 and power supply 14 are coupled together and docked to docking station 16, docking station 16 provides a recharge current to electronic device 12 (e.g., via connector members 70 and 71) and/or power supply 14 (e.g., via connector members 44 and 46) to facilitate recharging of any internal power supply of electronic device 12 and power supply 14 either together or independently. Further, when power supply 14 is in communicative engagement with docking station 16 after detachment of electronic device 12 from power supply 14 (and from docking station 16), the communicative coupling of connectors 44 and 46 enables a recharge current to travel directly from docking station 16 to power supply 14 to facilitate recharging of power supply 14 while power supply 14 remains docked in docking station 16. Additionally, as discussed in further detail below, electronic device 12 is coupleable directly to docking station 16 (i.e., without power supply 14 attached to electronic device 12) such that a recharge current is provided directly to electronic device by docking station 16 to facilitate recharging of an internal power supply of electronic device 12 (e.g., via connector members 70 and 71). In some embodiments, an internal power supply of electronic device 12 may be recharged by power supply 14 and/or power supply 14 may be recharged by electronic device 12 while docked in docking station 16. Accordingly, it should be understood that power supply 14 and any internal battery of electronic device 12 may be charged simultaneously or independently.

In the embodiment illustrated in FIG. 2, power supply 14 comprises a locking mechanism 48 for releaseably securing power supply 14 to a bottom surface 50 of electronic device 12. In the embodiment illustrated in FIG. 2, locking mechanism 48 comprises movable locking hooks 52a, 52b, 52c and 52d extending upwardly from top surface 28 of power supply 14 to engage corresponding recessed areas 54a, 54b, 54c and 54d disposed on bottom surface 50 of electronic device 12. According to some embodiments, locking hooks 52a, 52b, 52c and 52d are biased to releaseably secure power supply 14 to electronic device 12 and movable away from their biased state in response to movement of release buttons 56 and/or 58 disposed on rear surfaces 38a and 38b of power supply 14. For example, when coupling power supply 14 to electronic device 12, hooks 52a, 52b, 52c and 52d are insertable into recessed areas 54a, 54b, 54c and 54d to securely fasten power supply 14 to electronic device 12 in a locked position (locking hooks 52a, 52b, 52c and 52d are oriented within recessed areas 54a, 54b, 54c and 54d to prevent removal of hooks 52a, 52b, 52c and 52d from recessed areas 54a, 54b, 54c and 54d and thus prevent separation of electronic device 12 from power supply 14). Electronic device 12 is attachable to power supply 14 while power supply 14 is docked or undocked relative to docking station 16.

To release power supply 14 from electronic device 12, release buttons 56 and 58 are actuated (via actuation of release mechanism 26) to move hooks 52a, 52b, 52c and 52d to an unbiased or unlocked position (e.g., to position locking hooks 52a, 52b, 52c and 52d within recessed areas 54a, 54b, 54c, or 54d to enable removal of hooks 52a, 52b, 52c and 52d from recessed areas 54a, 54b, 54c and 54d) to facilitate detachment of power supply 14 from electronic device 12. Extensions 86 and/or 88 are disposed on adapter portion 20 of docking station 14 and extend outwardly from adapter portion 20 in response to actuation of release mechanism 26 to engage and otherwise actuate release buttons 56 and 58 on power supply 14. Upon actuation of release buttons 56 and 58, locking hooks 52a, 52b, 52c and 52d are disposed in the unlocked position. In FIG. 2, extensions 86 and 88 are shown in an extended position relative to adapter portion 20 for ease of description and illustration; however, it should be understood that extensions 86 and 88 preferably remain biased in a retracted position relative to adapter portion 20 in an un-actuated state to facilitate docking of power supply 14 on docking station 16. It should also be understood that locking mechanism 48 may be otherwise configured to securely fasten power supply 14 to electronic device 12, such as for example, including a greater or fewer number of locking hooks 52a, 52b, 52c and/or 52d or utilizing other methods of attachment. It should also be understood that if electronic device 12 and power supply 14 are coupled together and not docked in docking station 16, release buttons 56 and 58 are manually actuatable to release power supply 14 from electronic device 12.

In the embodiment illustrated in FIG. 2, docking station 16 comprises a connection assembly 60 configured to align and support power supply 14 on docking station 16 while also facilitating communications between electronic device 12 and docking station 16. In FIG. 2, connection assembly 60 comprises a front surface 62, a top surface 64 and a pair of side surfaces 66 and 68 configured to be inserted within recess area 40 of power supply 14. In the embodiment illustrated in FIG. 2, top surface 64 comprises connector member 70, alignment pins 72 and 74 for cooperating with corresponding recessed areas 76 and 78 disposed in bottom surface 50 of electronic device 12 to align electronic device 12 with docking station 16, and a locking mechanism 80 for securely fastening electronic device 12 to docking station 16.

In the embodiment illustrated in FIG. 2, locking mechanism 80 comprises movable locking hooks 82a and 82b extending upwardly from top surface 64 of connection assembly 60 to engage corresponding recessed areas 84a and 84b disposed on bottom surface 50 of electronic device 12. According to some embodiments, locking hooks 82a and 82b are biased to a position to releaseably secure electronic device 12 to docking station 16 and movable away from their biased state in response to actuation of either release mechanism 24 or 26. For example, hooks 82a and 82b are insertable into recessed areas 84a and 84b to secure electronic device 12 to docking station 16 (e.g., locking hooks 82a and 82b are biased within recessed areas 84a and 84b to prevent removal of hooks 82a and 82b from recessed areas 84a and 84b and thus prevent separation of electronic device 12 from docking station 16). To release electronic device 12 from docking station 16, depressing release mechanism 24 or 26 causes movement of locking hooks 82a and 82b away from their biased position to facilitate removal of hooks 82a and 82b from recessed areas 84a and 84b) and thereby facilitate detachment of electronic device 12 from docking station 16. It should be understood that locking mechanism 80 may be otherwise configured to securely fasten electronic device 12 to docking station 16, such as for example, including a greater or fewer number of locking hooks 82a and/or 82b or utilizing other methods of attachment.

In the embodiment illustrated in FIG. 2, docking station 16 comprises at least one power supply locking mechanism 94 disposed on adapter 20 to securely fasten power supply 14 to docking station 16. For example, in a partial detachment mode when detachment of electronic device 12 from docking station 16 is desired while leaving power supply 14 docked in docking station 16, power supply locking mechanism 94 retains power supply 14 in a docked relationship relative to docking station 16 and prevents power supply 14 from being inadvertently lifted with electronic device 12 from docking station 16 (e.g., as a result of frictional engagement between connector members 42 and 43). In the embodiment illustrated in FIG. 2, power supply locking mechanism 94 comprises an outwardly biased extension member 98 disposed on adapter portion 20 of docking station 20. Extension member 98 is outwardly biased so as to be insertable within a corresponding recessed area 104 disposed on rear surface 38b of power supply 14 to resist relative movement between power supply 14 and docking station 16. In the embodiment illustrated in FIG. 2, extension member 98 comprises a sloped top surface 100 to facilitate docking of power supply 14 on docking station 16 such that as power supply 14 is positioned on docking station 16, contact between rear surface 38b and extension member 98 causes extension member 98 to at least partially retract within adapter portion 20 until aligned with recessed area 104. Once extension member 98 is in alignment with recessed area 104, extension member is biased outwardly within recessed area 104 to securely fasten power supply 14 to docking station 16. Extension member 98 is actuatable (e.g., by depressing release mechanism 24) to retract extension member 98 from recessed area 104 to facilitate removal of power supply 14 from docking station 16. It should be understood that locking mechanism 94 may be otherwise configured to securely fasten power supply 14 to docking station 16, such as for example, including a greater or fewer number of extensions 98 or utilizing other methods of attachment.

Thus, according to the embodiment illustrated in FIG. 2, when power supply 14 and electronic device 12 are attached to each other and docked in docking station 16, actuation of full release mechanism 24 actuates locking mechanisms 80 and 94 to enable release of electronic device 12 with power supply 14 from docking station 16 (e.g., the full detachment mode). When power supply 14 and electronic device 12 are attached to each other and docked in docking station 16, actuation of partial release mechanism 26 actuates locking mechanisms 48 and 80 to enable detachment of electronic device 12 from power supply 14 and detachment of electronic device 12 from docking station 16 (e.g., the partial detachment mode) while power supply 14 is retained in docking station 16. If power supply 14 is docked in docking station 16 without electronic device 12 coupled thereto, actuation of mechanism 24 releases power supply 14 from docking station. Further, if electronic device 12 is docked in docking station 16 without having power supply 14 attached thereto, actuation of mechanism 26 releases electronic device 12 from docking station 16.

FIG. 3 is a diagram illustrating a partially exploded assembly view of electronic device docking system 10 of FIG. 1. In FIG. 3, electronic device 12 is detached from docking station 16 and power supply 14. In the embodiment illustrated in FIGS. 2 and 3, release mechanism 26 is depressed to actuate locking mechanisms 48 and 80 thereby enabling detachment electronic device 12 from power supply 14 and docking station 16. Further, actuation of release mechanism 26 also causes automatic extension of extensions 90 and 92 from connection assembly 60 to exert a force on bottom surface 50 of electronic device 12 to detach (e.g., lift) electronic device 12 from power supply 14 and docking station 16 and separate connectors 42 and 43 and connectors 70 and 71 from each other. To dock electronic device 12 to docking station 16 and to a docked power supply 14, recessed areas 76 and 78 are aligned with alignment pins 72 and 74 to facilitate alignment and communicative engagement of connector members 42 and 43 and connectors 70 and 71.

FIG. 4 is a partial exploded view of electronic device docking system 10 of FIG. 1 in which electronic device 12 and power supply 14 are detached from docking station 16. In the embodiment illustrated in FIGS. 2 and 4, release mechanism 24 is depressed to actuate locking mechanisms 48 and 94 thereby enabling detachment electronic device 12 and power supply 14, together, from docking station 16. In response to actuation of locking mechanisms 80 and 94, extensions 90 and 92 automatically extend from connection assembly 60 to exert a force on bottom surface 50 of electronic device 12 to detach (e.g., lift) electronic device 12 and power supply 14 and docking station 16 and separate connectors 44 and 46 and connectors 70 and 71. To dock electronic device 12 and power supply 14 to docking station 16, recessed areas 76 and 78 are aligned with alignment pins 72 and 74 to facilitate alignment and communicative engagement of connector members 44 and 46 and connectors 70 and 71.

Thus, embodiments of system 10 enable docking and detachment of electronic device 12 and power supply 14 in a variety of different modes or use applications.

What is claimed is:

1. An electronic device docking system, comprising:
    a docking station configured to receive docking of an electronic device with an external battery coupled thereto, the docking station comprising at least one mechanism actuatable to cause detachment of the electronic device from both the external battery and the docking station.

2. The system of claim 1, wherein the docking station is configured to retain the external battery in a docked state in response to actuation of the at least one mechanism.

3. The system of claim 1, wherein the docking station comprises another mechanism actuatable to cause detachment of the external battery from the docking station.

4. The system of claim 1, wherein the at least one mechanism is configured to cause actuation of a locking mechanism disposed on the external battery to release the external battery from the electronic device.

5. The system of claim 1, wherein the docking station is configured to recharge the external battery while docked and while the electronic device is undocked relative to the docking station.

6. The system of claim 1, wherein the docking station comprises a first connector member coupleable to the electronic device and a second connector member coupleable to the external battery.

7. The system of claim 1, wherein the docking station comprises a locking mechanism to securely fasten the external battery to the docking station.

8. A method of manufacturing an electronic device docking system, comprising:
    configuring a docking station for docking of an electronic device with an external battery coupled thereto; and
    providing at least one mechanism actuatable to cause detachment of the electronic device from both the external battery and the docking station.

9. The method of claim 8, further comprising configuring the docking station to retain the external battery in a docked state in response to actuation of the at least one mechanism.

10. The method of claim 8, further comprising providing another mechanism configured to enable detachment of the external battery from the docking station.

11. The method of claim 8, further comprising configuring the at least one mechanism to cause actuation of a locking mechanism of the external battery to release the external battery from the electronic device.

12. The method of claim 8, further comprising configuring the docking station to recharge the external battery while docked and while the electronic device is undocked relative to the docking station.

13. The method of claim 8, further comprising providing on the docking station a first connector member coupleable to the electronic device and a second connector member coupleable to the external battery.

14. The method of claim 8, further comprising providing a locking mechanism to releaseably secure the external battery to the docking station.

15. A dockable power supply system, comprising:
    means for docking of an electronic means with a battery means coupled thereto; and
    actuatable means for causing detachment of the electronic means from both the battery means and the docking means.

16. The system of claim 15, further comprising means for retaining the battery means in a docked condition relative to the docking means in response to actuation of the actuatable means.

17. The system of claim 15, further comprising means for recharging the battery means while docked and while the electronic means is undocked relative to the docking means.

18. The system of claim 15, further comprising a first means disposed on the docking means for coupling to the electronic means and a second means disposed on the docking means for coupling to battery means.

19. The system of claim 15, further comprising means for detaching the battery means from the docking means.

* * * * *